April 25, 1961 S. GRYGLAS 2,980,986
CUTTER HEAD FOR PLATING RACKS
Filed Nov. 12, 1958
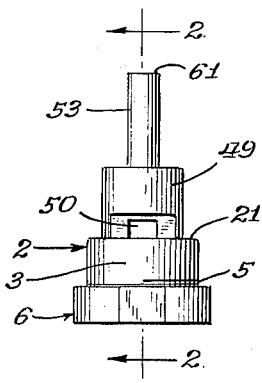
Fig. 1.
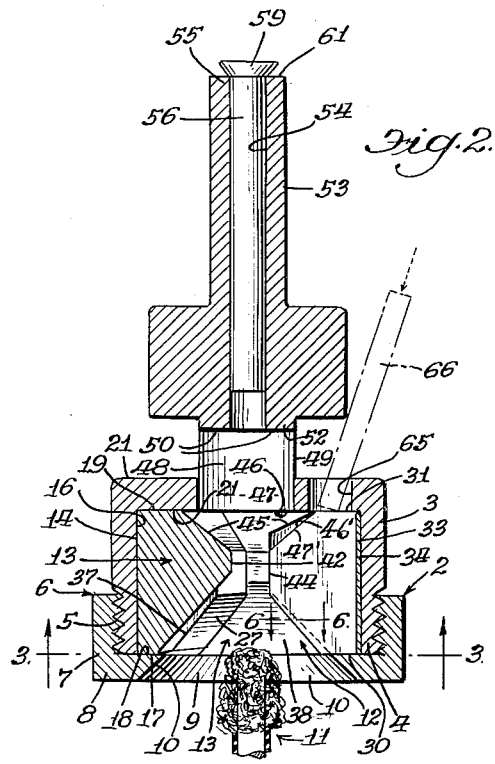
Fig. 2.
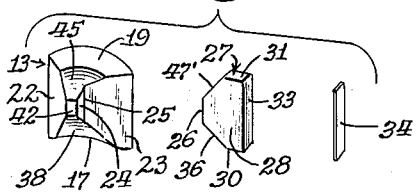
Fig. 4.
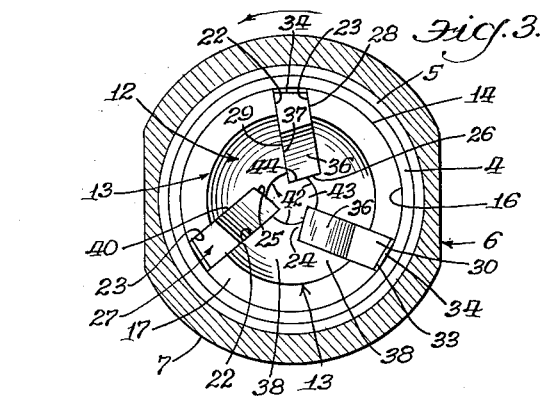
Fig. 3.
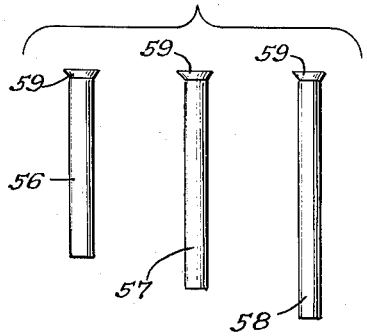
Fig. 5.
Fig. 6.
Inventor:
Stephen Gryglas
By John J. Kowalik
Atty.

United States Patent Office 2,980,986
Patented Apr. 25, 1961

2,980,986

CUTTER HEAD FOR PLATING RACKS

Stephen Gryglas, 1874 Fenton Lane, Park Ridge, Ill.

Filed Nov. 12, 1958, Ser. No. 773,415

9 Claims. (Cl. 29—105)

This invention relates to a cutting device and more specifically to a cutter head for cleaning accreted material on the fingers of plating racks.

Plating racks in general comprise a standard with a plurality of outstanding hooks or fingers for suspending articles to be plated in the plating bath. The standard and fingers are covered with insulating material except at their ends where the plating metals accrete. Such accretions become too bulky and prevent mounting the articles to be plated.

A general object of the invention is to provide a novel rotary cutter head which comprises a conical guide cavity with cutting teeth projecting thereinto and arranged to obtain an efficient progressive cutting action with minimum maintenance or clogging.

A general object of the invention is to provide a novel cutter head which is simple to use to quickly effectively clean the hangers or hooks of plating racks.

A further object is to devise a novel cutter head which incorporates a cutting cavity of novel form for guiding the tool onto the rack tips, the cavity being substantially conical and widening outwardly and interrupted by a plurality of cutting blades which extend the full depth of the cavity so as to cut along the full extent of the material entered into the cavity.

A more specific object is to provide a novel mounting for the cutter blades which exposes the cutting edges of the blades for the full depth of the cavity, the blades being oriented to provide forwardly or outwardly facing cutting edges which converge toward a sizing opening, the blades having cutting edges projecting into the opening and formed as continuations of the forwardly facing edges.

A still further object of the invention is to provide a novel cutter which is self cleaning and exceptionally free from clogging and which provides a chip-receiving cavity widening in the discharging direction thereof and which communicates with radially outwardly open diametric discharge passages for throwing chips and particles out of the cutter.

These and other objects will become more readily apparent from the specification and the drawings, wherein:

Figure 1 is a side elevational view of the cutter head;

Figure 2 is an enlarged sectional view taken substantially on line 2—2 of Figure 1;

Figure 3 is a cross-sectional view taken substantially on line 3—3 of Figure 2;

Figure 4 is an exploded view illustrating several internal parts of the cutter;

Figure 5 illustrates several different gauge pins for controlling the length of cut;

Figure 6 is an enlarged fragmentary sectional view taken substantially on line 6—6 of Figure 2.

Describing the invention in detail, the cutter head generally indicated 2 comprises an annular sleeve like forward socket portion 3 externally threaded at its forward end 4 as at 5 upon which is threaded a retainer 6 which comprises a ring portion 7 and an inturned flange 8.

The flange 8 has a center aperture 9 with a frustoconical surface 10 which focuses inwardly and provides a guide for entering a metal encrusted finger 11 of a plating rack into the cutting well 12 which is defined by the three identical combination knife mounting and spacer members 13, 13, 13.

Each member 13 comprises an arcuate outer peripheral surface 14 in complementary engagement with the internal mating surface 16 of the mounting sleeve or socket portion 3. Each member 13 has a forward transaxial flat edge 17 which seats against the back or inner side 15 of flange 8 and is thrust thereby to engage its radial back edge 19 against the opposing radial face 20 on the back wall 21 of the socket 3, the wall 21 being integral with the sleeve portion 3.

It will be noted that each member 13 is a wedge shaped arcuate segment and is provided with axially extending radial side 22 and non-radial side 23, each side 23 terminating in a seating shoulder 24 projecting transversely of the face 23 and providing a radially outwardly facing seating surface 25 against which seats a portion of the inner edge 26 of a knife or blade 27.

Each blade 27 is substantially flat and has a trailing side 28 seated against the leading face 23 of the related member 13 and has a leading side or face 29 seated against the radial trailing side 22 of the member 13 forwardly thereof as respects the direction of rotation of the tool as shown by the arrow in Figure 3. The forward and rear ends 30 and 31 seat respectively against the surfaces 18 and 20 of the retainer and the socket. Each blade has an outer edge 33 which in the present instance abuts through a shim 34 against the internal periphery 16 of the socket 3. The shim may be eliminated and the edge 33 bear against 16. Each blade has a forward side 36 which is preferably flat and disposed at an acute angle and in converging relation to the leading face 29 and defines a sharp leading edge 37 therewith which projects forwardly of the conical forwardly facing surface 38 on the member 13 thereahead. It will be seen that the forward conical segmental faces 38 on the members 13 collectively define the cutting cavity 12 and that the trailing corners 40 of the blades merge into the surfaces 38 whereby generally triangular segments of the blades project into the cutting cavity 12.

The radially inner sides or edges 42 of the members 13 define an axial passage 43 therebetween and are slightly short of the inner edges 44 of blades which are continuations of respective cutting edges 37.

The back sides 45 of the members 13 are conical segments and collectively provide a rearwardly conical widening chip-receiving cavity 46. The rear or back edges 47' of the blades are angled and terminate short of the surfaces 45. The surfaces 45 of cavity 46 guide the chips as they fly out centrifugally, diagonally rearwardly into a central opening 47 in the back wall 21 of the socket and the opening 47 leads into a chip opening 48 in a cylindrical axial extension or intermediate portion which is indicated at 49 and is of reduced diameter and formed integral with the wall 21 and extending rearwardly therefrom. The cavity 48 communicates at diametrically opposite sides thereof with discharge openings 50, 50 in the sides of the extension 49. The openings 50 each extend axially from wall 21 beyond the inner radial wall 52 which terminates the chip bore 48.

The wall 52 is formed integral with a coaxial cylindrical chucking shank 53 projecting rearwardly therefrom. The shank or stem portion 53 is provided with an axial bore 54 open at both ends and adapted to receive from its rear end 55 one of several gauge pins 56, 57 or 58 of different lengths (Figure 5). Each pin has a head 59 adapted to seat at 60 against the surface 61 on shank or stem 53 and project different distances through the bore 54. The longer pins extend respectively into the cavity 48 and 46 and limit the extent of cut of the tool by limiting the distance the finger can enter into the tool.

The back wall 19 is provided with a knock out opening 65 for admitting a pin 66 through which the parts in the socket 3 can be knocked out after the retainer 6 is removed.

*Operation*

To operate the unit, a suitable pin 56, 57, or 58 is inserted in bore 54 and the unit is secured by its spindle 53 in a chuck of a high speed electric or pneumatic driving mechanism of conventional construction. The encrusted ends of the fingers 11 are admitted into the well 12 and the cutter advanced onto the tip as the blades 27 shear the metal glob off the finger. The stripped finger progresses along surfaces 38 into the center passage 43 and sized by the edges 44 as it progresses with the chips into the cavity 46. The chips are flung centrifugally outwardly and are guided through passage 47 and through cavity 48 out through openings 50, 50. The tip of the finger moves through cavity 48 into the bore 54 until it engages the pin 56. If pin 57 is used, it projects into cavity 48 and if pin 58 is used, it extends into the cavity 46. The longer the pin, the shorter the cut.

Since the rear edges 47' of the blades terminate short of the rear sides 45 of the members 13 and define grooves 46' extending outwardly from the sizing bore 43 (Figure 3) and open rearwardly to cavity 46. Thus with the longest pin 58 in place the chips or cuttings still escape around the pin into the cavity 46.

It will be understood that the foregoing embodiment depicts the best form of the invention and that other forms will become readily apparent to those skilled in the art within the scope of the appended claims.

What is claimed is:

1. A cutter head comprising a socket portion open at one end and having a wall at the other end and an axial stem projecting from the wall, an annular series of combination blade holder and separator members mounted in said socket portion, retainer means connected to said portion and securing said members within said portion between the same and said wall, each member having a radially extending trailing side and a leading side generally parallel to and opposing the trailing side of the adjacent member and circumferentially spaced therefrom, a shoulder on the radially inner end of each member projecting circumferentially thereof from said trailing face toward the adjacent member and having an outwardly facing seat, blades interposed between said members in engagement with the trailing and leading faces thereof and having inner edges partially seated upon the seat and having an edge projecting outwardly from the seat into a central sizing opening, each member having a segmental conical forward face, said conical faces collectively defining a cavity for admitting a work-piece therein, said blades having forward diagonal sides converging toward said sizing opening and having radial cutting edges projecting forwardly of said faces, said forward sides sloping circumferentially from said radial edges toward respective conical faces and merging thereinto.

2. A cutter head comprising a cylindrical socket part and an axially extending stem part, three circumferentially spaced separator and holder elements secured in said socket part, each element having a forward segmental conical face, said conical faces collectively defining a work-receiving cavity, said elements having inner ends spaced from each other radially and defining a central opening, a plurality of blade members embraced by and between said elements and each presenting cutting edges extending into the cavity and opening respectively, a shoulder on each element seating the respective member adjacent to said opening, said elements and members having rear sides forming a rearwardly diverging chip disposing cavity focused toward and communicating with said central opening, and said stem having radial openings communicating through a rear opening in said socket part.

3. A cutter head comprising a support, a cutter assembly comprising an annular series of separators and blades carried within the support, said assembly defining an hour-glass shaped axial passageway therethrough including a forwardly flaring work-receiving cavity, an intermediate constricted sizing bore and a rearwardly diverging chip cavity, said support having an axial bore communicating with said chip cavity and having radial diametrical exit openings communicating with the bore, said separators projecting beyond said blades into the chip cavity and providing radial surfaces extending widthwise axially of the bore and having inner end portions adjacent to the bore.

4. The invention according to claim 3 and said blades having inner edges projecting into said bore and a shoulder on each said separator underposed with respect to a portion of the inner edge of the related blade.

5. In a cutter of the type comprising a holder including a socket portion and an axially elongated portion with an axial bore therethrough communicating with said socket portion, a cutting assembly carried by said socket portion and providing a work-admitting bore coaxial with said first-mentioned bore and communicating therewith, and gauge means comprising a stem insertable into said first mentioned bore and providing a stop facing into said work-admitting bore for abutment with the work to limit its entry into the cutter, said cutter assembly having a recessed end defining a chip cavity communicating with the bores, and said stem having a diameter substantially smaller than the cavity, and said assembly having at least one portion projecting axially into said cavity and presenting an axially directed surface extending substantially radially outwardly from said work-admitting bore.

6. In a cutter of the type comprising a holder including a socket portion and an axially elongated portion with an axial bore therethrough communicating with said socket portion, a cutting assembly carried by said socket portion and providing a work-admitting bore coaxial with said first-mentioned bore and communicating therewith, and gauge means comprising a stem insertable into said first mentioned bore and providing a stop facing toward said work-admitting bore for abutment with the work to limit its entry into the cutter and said cutting assembly having a rearwardly flaring back side widening said bore therein into a rearwardly flaring cavity and said stem centered with respect to said cavity and having a smaller diameter than the cavity, said cavity providing an escape passage for particles removed from the work, and said elongated portion having a radial exit opening communicating with said cavity, and said assembly presenting a plurality of surfaces projecting axially from the work-admitting bore toward said cavity and projecting radially to the periphery of the cavity.

7. A cutter head comprising a socket portion and an axial portion connected to the socket portion, a cutter assembly mounted in the socket portion and comprising a plurality of separator and holder members each having segmental conical front and rear sides, an axially extending arcuate side and lateral leading and trailing sides, a circumferentially projecting shoulder on the leading side of each member adjacent to its inner side, a blade interposed between the leading and trailing sides of contiguous members and being of a width greater than the extent of the shoulder and having an axially extending edge projecting beyond the inner sides of said members into an axial bore defined thereby and having a forward edge projecting forwardly of said forward sides into an inwardly tapering cavity communicating with the bore, said blades being shorter than said sides and having diagonal rear edges defining grooves with the sides of the adjacent members communicating with said central bore and with a rearwardly flaring cavity defined by the rear sides of said members, and said axial portion having a central bore communicating with said last-mentioned cavity and having radial discharge openings for particles and cuttings deposited in said last-mentioned cavity.

8. A cutter head comprising a holder, a cutter assembly mounted therein comprising an axial work-receiving bore and an enlarged chip cavity leading from the bore to the rear of the holder, said holder having a radial exit opening communicating with said cavity, and said assembly providing a plurality of grooves open to said cavity and extending outwardly from said bore and providing axially tapered radially outwardly extending surfaces.

9. The invention of claim 7 including a guage pin of preselected length inserted in said bore in said axial portion and extending a preselected length with respect to said cavity and centered within the cavity and providing a space with the periphery of the cavity accommodating exit of chips from the bore.

References Cited in the file of this patent

UNITED STATES PATENTS

| | | |
|---|---|---|
| 630,081 | Brown | Aug. 1, 1899 |
| 804,142 | Lassiter | Nov. 7, 1905 |
| 1,155,211 | Carpenter | Sept. 28, 1915 |
| 1,533,314 | Fox | Apr. 14, 1925 |
| 2,292,581 | Richardson | Aug. 11, 1942 |
| 2,323,834 | Moller | July 6, 1943 |
| 2,473,654 | Loeser | June 21, 1949 |
| 2,618,997 | Fellroth | Nov. 25, 1952 |

FOREIGN PATENTS

| | | |
|---|---|---|
| 66,182 | Sweden | Oct. 16, 1928 |
| 608,348 | France | Apr. 20, 1926 |
| 112,850 | Great Britain | Jan. 31, 1918 |